(12) United States Patent
Wang

(10) Patent No.: US 11,950,734 B2
(45) Date of Patent: Apr. 9, 2024

(54) PORTABLE TOILET SEAT COVER

(71) Applicant: Shuihao Wang, Beijing (CN)

(72) Inventor: Shuihao Wang, Beijing (CN)

( * ) Notice: Subject to any disclaimer, the term of this patent is extended or adjusted under 35 U.S.C. 154(b) by 322 days.

(21) Appl. No.: 17/513,579

(22) Filed: Oct. 28, 2021

(65) Prior Publication Data

US 2022/0047130 A1 Feb. 17, 2022

Related U.S. Application Data

(63) Continuation-in-part of application No. PCT/CN2020/087297, filed on Apr. 27, 2020.

(30) Foreign Application Priority Data

Apr. 29, 2019 (CN) .......................... 201910356924.8

(51) Int. Cl.
| | | |
|---|---|---|
| *A47K 13/16* | (2006.01) | |
| *C09J 7/20* | (2018.01) | |
| *C09J 7/29* | (2018.01) | |
| *C09J 11/04* | (2006.01) | |
| *C09J 11/06* | (2006.01) | |

(52) U.S. Cl.
CPC ............... *A47K 13/16* (2013.01); *C09J 7/201* (2018.01); *C09J 7/29* (2018.01); *C09J 11/04* (2013.01); *C09J 11/06* (2013.01); *C09J 2203/37* (2020.08)

(58) Field of Classification Search
CPC ... A47K 13/16; C09J 7/29; C09J 7/201; C09J 11/04; C09J 11/06; C09J 2203/37
USPC .......................................................... 4/245.7
See application file for complete search history.

(56) References Cited

U.S. PATENT DOCUMENTS

| | | | |
|---|---|---|---|
| 2007/0201390 A1* | 8/2007 | Kim ...................... | H04W 4/18 |
| | | | 370/310.2 |
| 2012/0017361 A1* | 1/2012 | Lankenau .............. | A47K 13/16 |
| | | | 4/244.3 |
| 2014/0317837 A1* | 10/2014 | Chien .................... | A47K 13/16 |
| | | | 4/245.7 |
| 2016/0324379 A1* | 11/2016 | King, Sr. ............... | A47K 13/16 |
| 2020/0352401 A1* | 11/2020 | Mojtabaie .............. | A47K 13/16 |

FOREIGN PATENT DOCUMENTS

| | | |
|---|---|---|
| CN | 107661060 A | 2/2018 |
| CN | 108713995 A | 10/2018 |

\* cited by examiner

*Primary Examiner* — Huyen D Le
(74) *Attorney, Agent, or Firm* — Frank Gao, Esq.

(57) ABSTRACT

The present disclosure belongs to the technical field of disposable toilet seat covers, and in particular to a novel portable toilet seat cover. The novel portable toilet seat cover comprises more than one unit layers, each unit layer comprises a surface layer, and a base layer. The surface layer is arranged at a first surface of the base layer, and the bottom layer is arranged at a second surface of the base layer; the surface layer is a release layer for preventing skin adhesion.

20 Claims, 14 Drawing Sheets

PORTABLE TOILET SEAT COVER

CROSS-REFERENCE TO RELATED PATENT APPLICATIONS

This application is a continuation in part of PCT Patent application with application number PCT/CN2020/087297, which was filed on Apr. 27, 2020, which claims priority to the Chinese application number 201910356924.8, filed Apr. 29, 2019, the contents of which are herein incorporated by reference.

TECHNICAL FIELD

The present disclosure is the technical field of disposable toilet seat covers, and in particular to a novel portable toilet seat cover.

BACKGROUND

With the gradual development of economy, sitting flush toilets are arranged in bathrooms of public places such as hotels, restaurants, and shopping malls. This brings a new hygiene problem—the intimate contact of people with public health facilities may cause cross-infection of skin diseases.

To solve this problem, a disposable toilet seat cover is widely used in the public place. In the prior art at present, the disposable toilet seat cover is mainly a box-packed paper toilet seat cover, and a user needs to re-lay the toilet seat cover when using the same every time, which brings the problems of mismatch size, difficulty in fixing an installation position, and the like.

But there is a problem that the user is still required to replace the toilet seat cover every time.

The Chinese patent application entitled "Portable Toilet Seat Cover" (with Application No. 201810554880.5) discloses a disposable toilet seat cover with adhesive at one face, which solves the problem of difficulty in fixing an installation position.

The Chinese patent application entitled "Toilet Seat Cover" (with Application No. 201610617507.0) discloses a technical solution that a multilayer paper cover is adhered on a cotton toilet seat base pad through an adhesive tape, and the purpose that the toilet seat cover does not need to be repeatedly installed by a user and can be repeatedly used.

However, the technical solutions all have the following unsolved problems:

1. The thickness is large, number of stacked layers per unit thickness is preferred, and frequent replacement is needed in public places with larger pedestrian volume;

2. The toilet seat cover made of a paper material is easy to be infiltrated and ruined by fluid such as splashed water and like, and thus is hard to get the trust of the user when used in public places.

3. The toilet seat cover using a cotton base pad is high in cost and easy to breed bacteria and viruses.

The polymer materials are widely applied to various fields. Medical polymer materials are widely applied to the medical field due to the characteristics of safety to human bodies, degradability, and the like.

At present, there is not any disposable toilet seat cover which is made of a polymer film material and free of repeated installation.

Based on this, there is an urgent need to provide novel portable toilet seat cover and a toilet to solve problems in prior art.

SUMMARY

The present discloses provides a novel portable toilet seat cover and a toilet to solve the problems in the background art at present.

A novel portable toilet seat cover comprises a multiple unit layers. Each unit layer comprises a surface layer, and a base layer. The surface layer is arranged at a first surface of the base layer, and the bottom layer is arranged at a second surface of the base layer; the surface layer comprises a release layer for preventing skin adhesion; the bottom layer is a bonding layer for bonding various unit layers, and the base layer is made of a flushable material.

Further, the surface layer is made of a hydrophobic water impermissible material.

Preferably, the surface layer is made of one or more of paraffin, silicone grease, and silicone oil.

Further, the base layer is mixed with and/or loaded with one or more of nano silver and antimicrobial peptide.

Further, the base layer is made of a degradable polymer material.

Preferably, the base layer is made of one or more of polylactic acid, biodegradable PET (polyethylene terephthalate), polybutylene succinate, polybutylene caproate, polyhydroxybutyrate, polybutylene valerate, polyethylene succinate, polyester acid amine, polycaprolactone, polyvinyl alcohol, starch, and chitosan.

Further, the base layer is made of other plastic added with an additive for enhancing degradation capability.

Preferably, the base layer is made of plastic added with an additive for enhancing degradation capability, including one or more of polyvinyl chloride, polyethylene, polypropylene, and polystyrene.

Preferably, the bottom layer is made of one or more of acrylate glue, and adhesive.

Further, the novel portable toilet seat cover comprises 50-100 layers of the unit layer, for example.

Further, the thickness of the novel portable toilet seat cover is less than or equal to 1 cm, for example.

Further, the unit layer is provided with a bulge, the bulge is arranged at the edge of the unit layer and is used for facilitating tear-out of the unit layer.

Further, the bulge is provided with a mark for prompting the quantity of the remaining available unit layer.

Further, the mark adopts at least one of numbers, letters, characters, patterns, and colors.

Further, the novel portable toilet seat cover is of a split type or an integral type, the split type is that two novel portable toilet seat covers are respectively arranged on two sides of a toilet seat for simultaneous use, and the integral type is that one novel portable toilet seat cover is independently used.

Further, the novel portable toilet seat further comprises an adjusting part for being matched with different models of toilets.

Further, the adjusting part adopts a retractable structure or an opening.

Further, the novel portable toilet seat cover further comprises an adhesive layer, the adhesive layer is arranged at the bottom of the novel portable toilet seat cover film and used for putting onto the novel portable toilet seat cover.

Further, an adhesive layer comprises a glue layer, and a release paper. When the toilet seat cover is used, the release paper is uncovered to fix the novel portable toilet seat cover by using the adhesive layer.

Further, the novel portable toilet seat cover further comprises a fixing part, and the fixing part is used for fixing the novel portable toilet seat cover.

Preferably, the fixing part adopts a sleeve or a bandage structure.

Further, the present disclosure further discloses a toilet seat which comprises the novel portable toilet seat cover.

In another embodiment, a replaceable cover adapted to fit over the seating surface of a toilet seat may comprise a semi-rigid annular body formed of a sheet of thin moldable resilient material and more than one layer of peelable, flushable, biodegradable unit layer formed on said contoured top surface. The body may extend around a central opening and having inner and outer edges which extend continuously around said body. The inner edge is adjacent said central opening and the body having a contoured top surface which includes continuous inner and outer downwardly-depending sides. The inner side curving inwardly and downwardly into said central opening to said inner edge of said body and outer side curving outwardly and downwardly to said outer edge of said body to produce a contoured shape which generally corresponds to the shape of the surface of a toilet bowl over which the cover is adapted to fit.

Optionally in any embodiment, each unit layer may comprise a surface layer, a base layer, and a bottom layer. The surface layer is arranged at a first surface of the base layer, and the bottom layer is arranged at a second surface of the base layer. The surface layer comprises a release layer for preventing skin adhesion.

Optionally in any embodiment, the bottom layer comprises a bonding layer for bonding the various units.

Optionally in any embodiment, the unit layer is provided with a bulge, the bulge is arranged at the edge of the unit layer and used for facilitating tear-out of the unit layer.

Optionally in any embodiment, the bulge is provided with a mark for prompting quantity of the remaining available unit layers; and the mark adopts at least one of numbers, letters, characters, patterns, and colors.

Optionally in any embodiment, the replaceable cover further comprises an adjusting part, and the adjusting part adopts a retractable structure or an opening.

Optionally in any embodiment, the replaceable cover further comprises a fixing part, and the fixing part adopts a sleeve or a bandage structure.

Further in another embodiment, a replaceable cover adapted to fit over the seating surface of a toilet seat may comprise a semi-rigid annular body formed of a sheet of thin moldable resilient material and more than one layer of peelable, flushable, biodegradable unit layer formed on said contoured top surface.

The body may extend around a central opening and have inner and outer edges which extend both sides around said body. The inner edge is adjacent said central opening.

The body may have a contoured top surface which includes continuous inner and outer downwardly-depending sides. The inner side may curve inwardly and downwardly into said central opening to the inner edge of said body and outer side curving outwardly and downwardly to said outer edge of said body to produce a contoured shape which generally corresponds to the shape of the surface of a toilet bowl which the cover is adapted to fit.

In use, the novel portable toilet seat cover is firstly fixed on the toilet seat, each user only needs to tear off one layer of the unit layer before or after use of the toilet seat cover. When the mark shows that the unit layer is exhausted or nearly exhausted, a worker may replace the toilet seat cover.

Due to the fact that excessive thick of the toilet seat cover may cause inconvenient use of the user, the thickness of the toilet seat cover is limited. For a preset disposable toilet seat cover, fewer layers may cause frequent replacement, and an original intention of design for convenience in use cannot be achieved. Due to the adoption of a polymer resin film as a consumable body, compared with traditional paper, the toilet seat cover disclosed by the present disclosure may be made to be particularly thin, multiple layers may be set per unit thickness, thereby solving the problems.

Due to the fact that fluid such as water often splashes in bathroom, other preset disposable toilet seat covers can be soiled by common materials, and thus the later user may not use the toilet seat cover, and the original intention of design that the multilayer toilet seat cover is preset for convenience cannot be achieved. By adopting a hydrophobic material as the consumable body of the toilet seat cover, even if the sewage and like splash to the surface, the lower layer cannot be infiltrated, other preset unit layers cannot be soiled, and the use of the later user cannot be affected; and the original intention of design for convenience and hygiene is highlighted.

The purpose of providing the bulge in the present disclosure is to facilitate a user to tear off the unit layer serving as the consumable, and the original intention of design for convenience in use is highlighted.

The purpose of providing the mark in the present disclosure is to facilitate the user and a maintainer to observe a use state, the labor cost is reduced, and the original intention of design for convenience in use is highlighted.

The toilet seat cover disclosed by the present disclosure has the beneficial effects that:

1, The thickness is large, number of stacked layers per unit thickness is preferred, and the service time is long;
2, The effects of sterilization and disinfection are achieved;
3, The use is convenient, and there is no need for installation per time;
4. By adopting a hydrophobic material, other preset consumable units cannot be soiled, and the use of a later user cannot be affected;
5. The consumption per time is less, the cost is low, the degradation and environmental protection are achieved, and blockage is avoided;
6. A bulge is provided to facilitate removing used consumable unit layer;
7. A mark is provided to facilitate observation of the quantity of the remaining consumable unit, and the labor cost is saved;
8. The environment is protected due to the fact that paper is not used as the consumable.

DETAILED DESCRIPTION OF THE EMBODIMENTS

The following clearly and completely describes the technical solutions of the present disclosure with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In the following description, a number of materials are identified as suitable for various facets of the implementations. These materials are to be treated as exemplary and are not intended to limit the scope of the claims.

The general term, "toilet seat cover" is used herein to refer to any type of device, article, or apparatus that may be placed onto the seat or ring of a toilet and that is intended for a person to use the toilet to sit upon.

An article may be referred to as "disposable" meaning that it is easily discarded or thrown away and is not intended for multiple uses. Thus, an article formed of hard, molded plastic or similar material would not be considered disposable. An article may be referred to as "biodegradable" meaning that it is easily broken down chemically by the environment. Finally, a substance or article may be referred to as "water-soluble" meaning that it is partially, substantially, or completely dissolvable in water.

Figure 1:
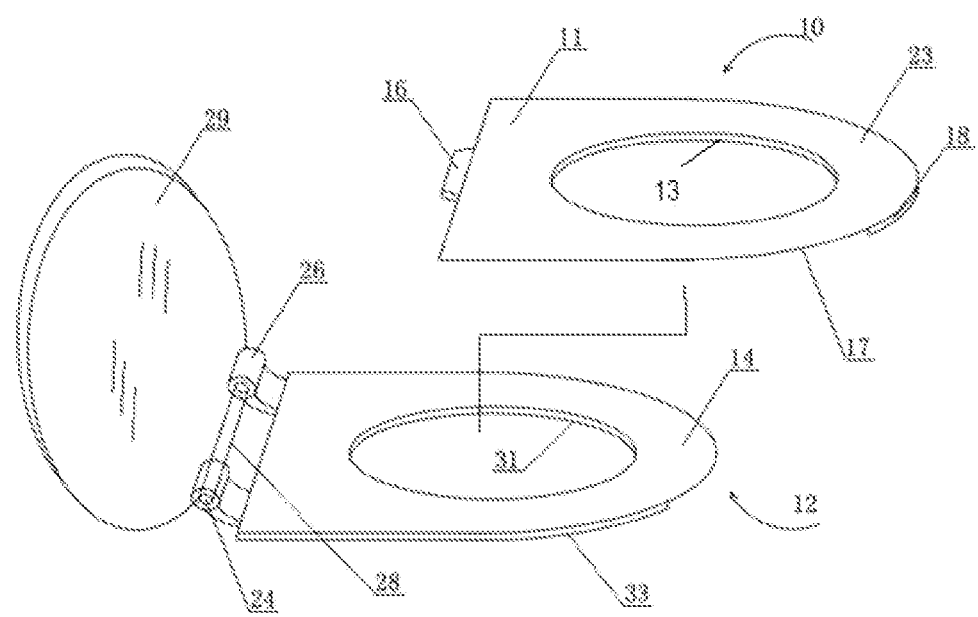
FIG. 1 is a perspective view of a replaceable toilet seat cover, in accordance with the present invention, positioned above a representative toilet seat.
Figure 2:
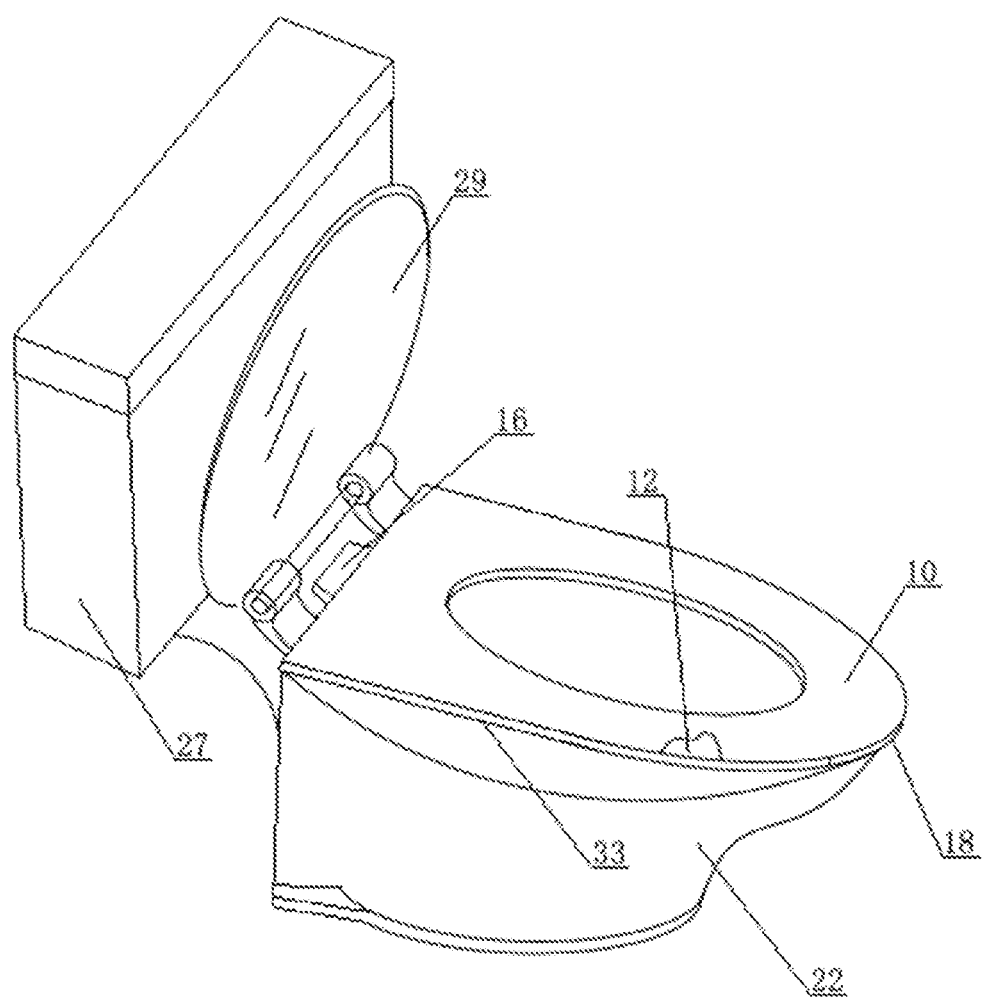
FIG. 2 is a partial, perspective view of the replaceable toilet seat cover shown in FIG. 1, partially cut away, in place on the toilet seat.

Referring to FIGS. 1 and 2, an embodiment of a replaceable toilet seat cover 10 is shown, in accordance with the present invention, positioned above a generally oval-shaped, toilet seat 12. FIG. 1 shows the toilet seat cover 10 prior to its installation on toilet seat 12 and FIG. 2 shows the cover in place on the toilet seat. The toilet seat 12 may be made of wood, plastic or plastic laminated over a fibrous wood or pressed-wood core.

Still in in FIG. 1, the toilet seat 12 includes a flat, curved or contoured top surface 14 and a generally flat bottom surface (not shown). Legs or bumper pads (not shown) are attached to the bottom surface and rest against the top of the toilet bowl 22 as shown in FIG. 2. A pair of hinges 24, 26 are attached to the back side of toilet seat 28, where the seat is hingedly attached to the toilet 27. The hinges 24, 26 allow the seat to be pivoted upwardly and downwardly relative to the toilet bowl 22. A hinged lid 29 is sometimes provided to close the toilet bowl and is compatible with use of the cover of the present invention.

Replaceable toilet seat cover 10 is shaped to generally conform to the top 14 of the toilet seat 12. Toilet seat cover 10 may comprise a semi-rigid annular body 11. The body 11 may extend around a central opening of a toilet and having inner edge 13 and outer edge 17 which extend continuously around said body 11 wherein said inner edge 13 is adjacent said central opening of the toilet. The body 11 has a top surface 23 which includes continuous inner and outer downwardly-depending edges 13 and 17, said inner side curving inwardly and downwardly into said central opening to said inner edge of said body and outer side curving outwardly and downwardly to said outer edge of said body to produce a contoured shape which generally corresponds to the shape of the surface of a toilet seat over which the cover 10 is adapted to fit.

The seat cover 10 may be formed of a sheet of thin moldable resilient material of a type which can be formed into a semi-rigid article by conventional molding techniques. Suitable materials for the body of cover 10 may include, for example, polyethylene, polypropylene, or a moldable paper product such as pressed cardboard or the like. The moldable resilient sheet material preferably has a thickness in the range of between about 10-mils and 20-mils, for example, resulting in a semi-rigid structure, which holds its shape but is flexible or resiliently bendable.

The toilet seat cover 10 is shaped to conform to the contoured top 14 of toilet seat 12, which includes a broad, generally flat, seating surface and inside and outside generally oval-shaped sidewalls 31 and 33 which complete top surface 14 (see FIG. 1). The outside wall 33 terminates at the front of the toilet seat 12 on both sides. The toilet seat cover 10 is not intended to cover the generally flat underside of toilet seat 12, except to engage the underside at its margins to retain the cover on the seat, as described below. The toilet seat cover 10 has a sidewall 18 in the front of the toilet seat cover 10. When the toilet seat cover 10 is attached onto the toilet seat 12, the sidewall 18 of the toilet seat cover 10 fits the sidewall 33 of the toilet seat 12 side by side snuggly.

By adopting a light, thin and degradable polymer resin film as a consumable body, the toilet seat cover film 30 may be fewer in consumption, environmentally friendly, and low in cost per time. Due to the lightness and thinness, the toilet seat cover film may be directly flushed into a sewage pipe network together with the sewage, and the blockage is avoided. Convenience is brought to both the user and the maintainer, and the original intention of design for convenience in use is highlighted.

Figure 3A:
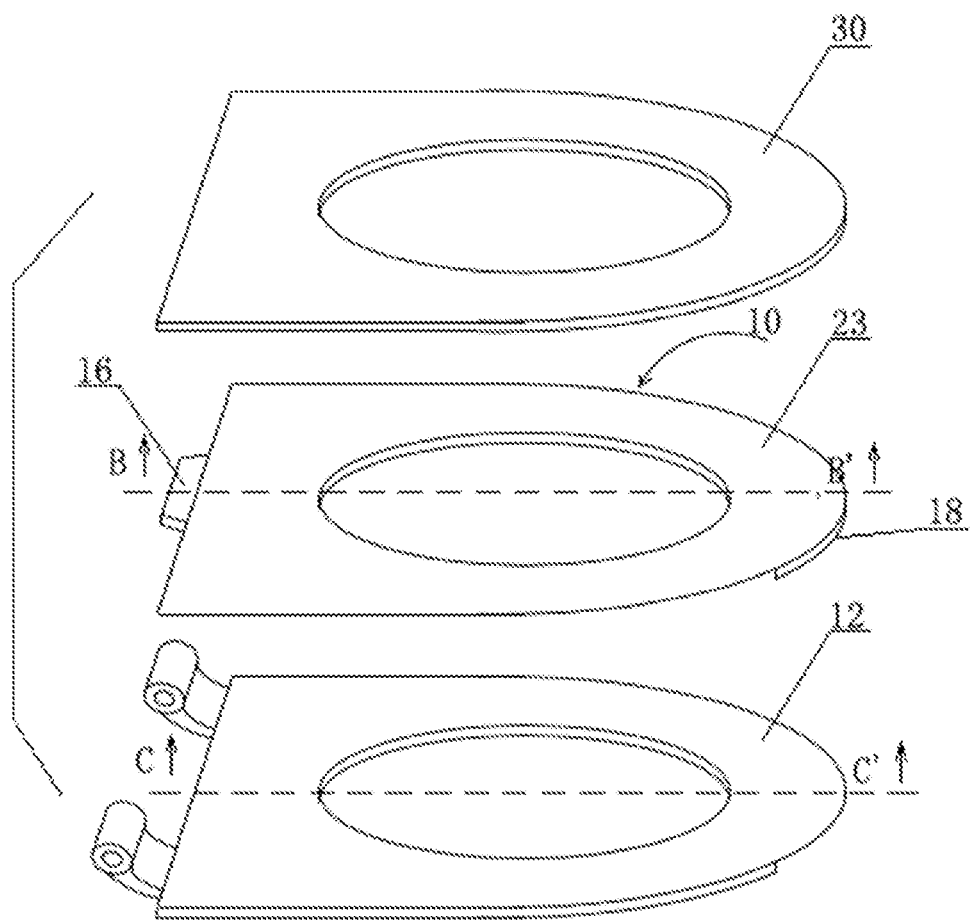
FIG. 3A shows a toilet seat, toilet seat cover, and removable unit layers on the top of the toilet seat cover according to one embodiment.

As shown in FIG. 3A, a novel portable toilet seat cover film 30 may be put on the top surface 23 of the toilet seat cover 10.

Figure 3B:
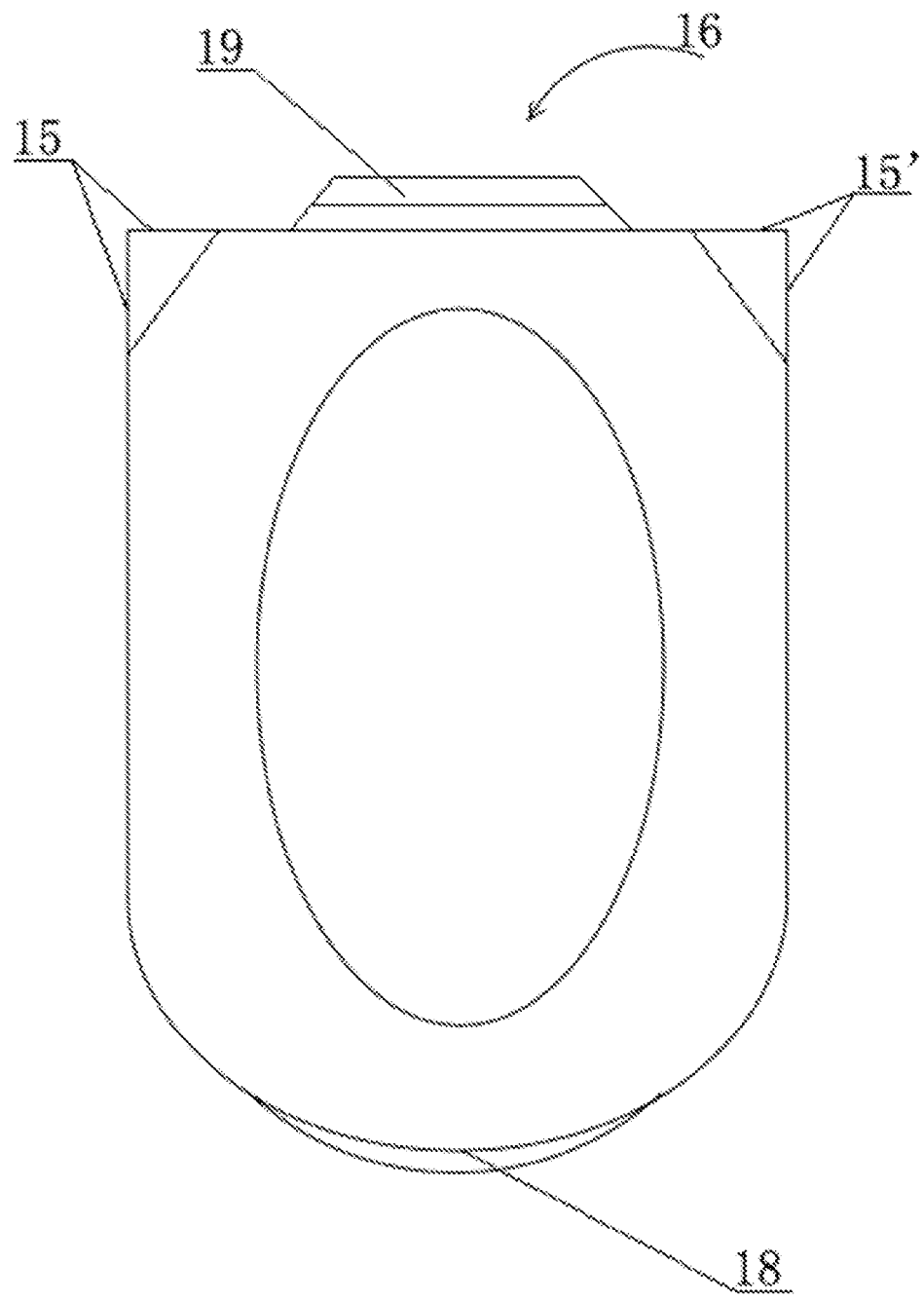
FIG. 3B shows a bottom side view of the toilet seat cover according to one embodiment.
Figure 3C:
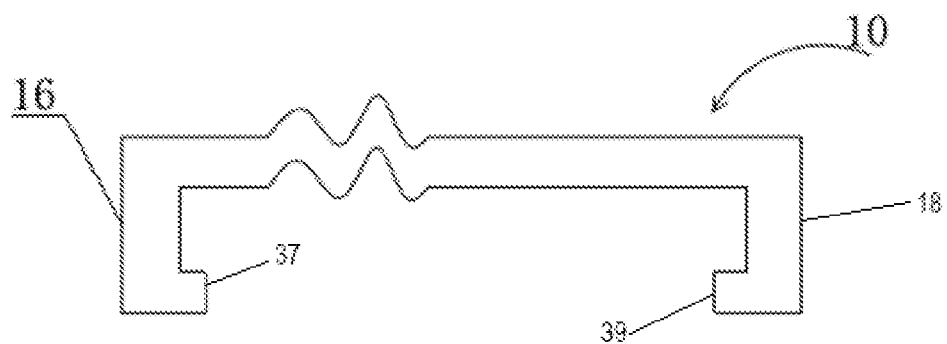
FIG. 3C shows a cross-section view from cut-away line of B-B' of FIG. 3A of toilet seat cover according to one embodiment.
Figure 3D:
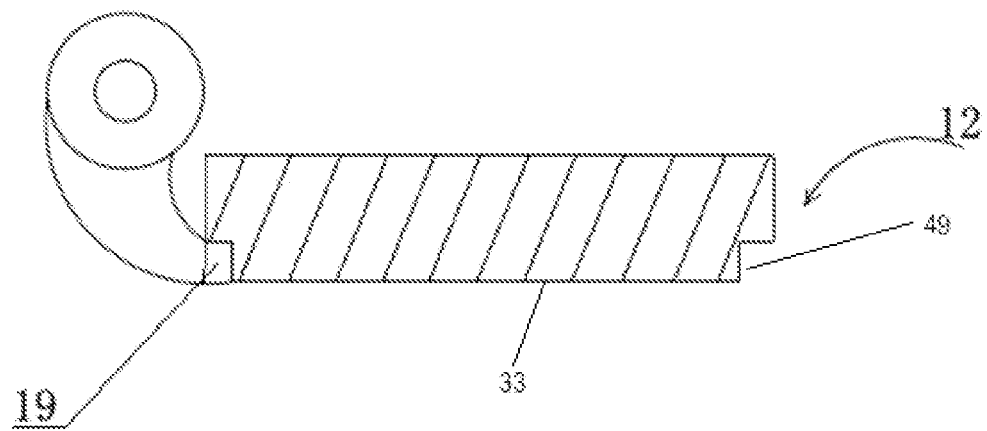
FIG. 3D shows a cross-section view from cut-away line of C-C' of FIG. 3A of toilet seat according to one embodiment

Further in FIG. 3B, the cover 10 further include a locking mechanism. The locking mechanism may include a latch 16 at the back of the toilet seat cover 10, corner sidewalls 15 and 15' at the back of the toilet seat cover 10 and the sidewall 18 of the toilet seat cover 10. The corner sidewalls 15 and 15' and sidewall 18 at the front of the toilet seat cover 10 may be vertical to the top surface 23. The toilet cover 10 may comprise a locking mechanism that locks the cover 10 to the toilet seat 12. The locking mechanism can be a hook, a latch, a Velcro, a lock, for example. In one embodiment, the latch 16 may include a hook 37, for example. The hook 37 may hook into a dent 19 on the toilet seat 12. In one embodiment, the sidewall 18 may have a straight wall. In another embodiment, the sidewall 18 may have a hook 39, which can hook to the indent 49 of the toilet seat 12 as shown in FIG. 3D. The indent 19 may be between the two hinges 24, 26 and has complementary shape as the hook 37 of the latch 16. Similarly, the indent 49 may have complementary shape as the hook 39.

In use, a person may put the toilet seat cover 10 with sidewall 18 in line with the sidewall 33 of the toilet seat 12, then push the other side of the toilet cover 10 toward the indent 19 of the toilet seat 12, thus locking the toilet seat cover 10 to the toilet seat 12.

Figure 4:
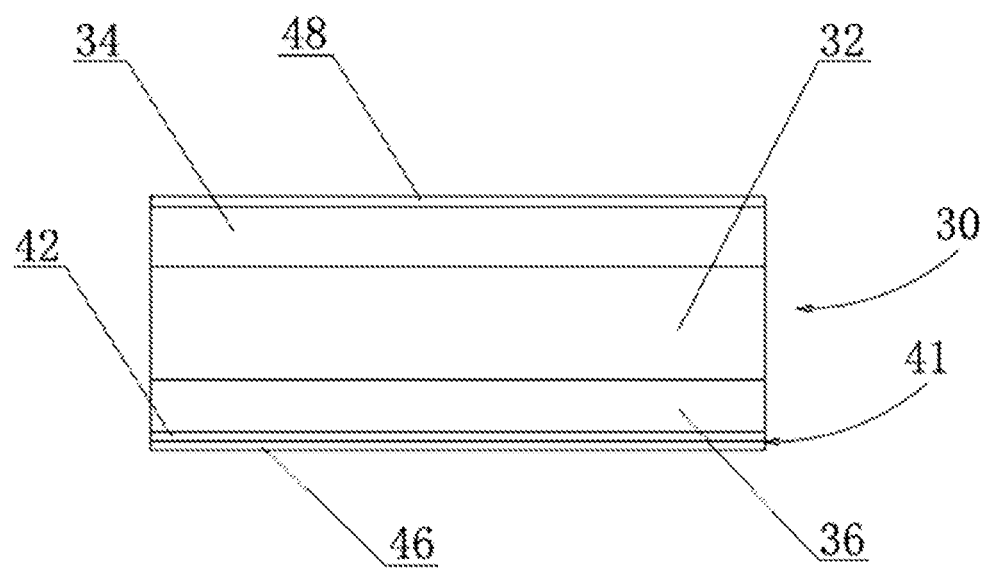
FIG. 4 is a diagram illustrating connection of various layers of unit layers according to the present disclosure.
Figure 5:
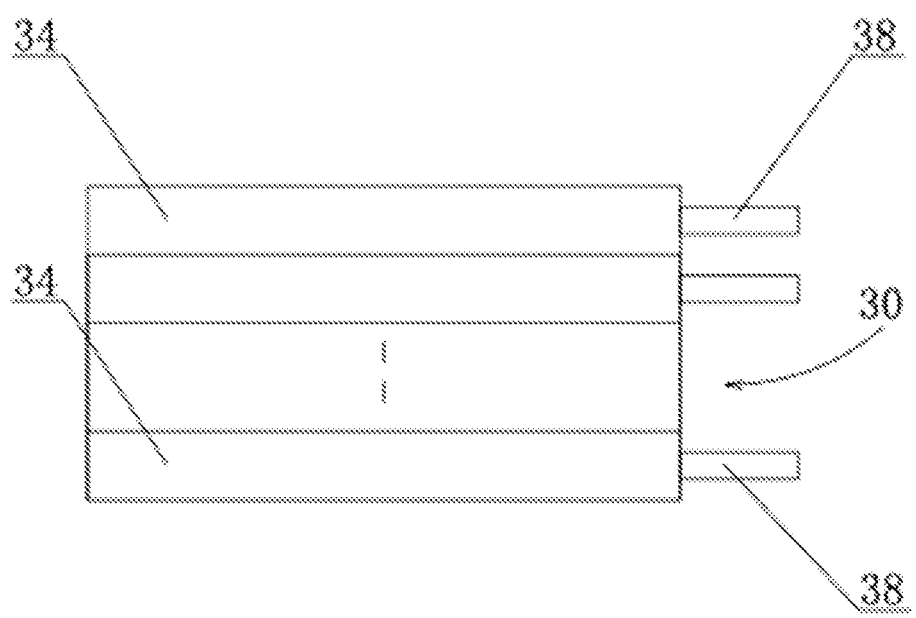
FIG. 5 is a diagram illustrating a stack-up structure of a plurality of unit layers according to the present disclosure.
Figure 6:
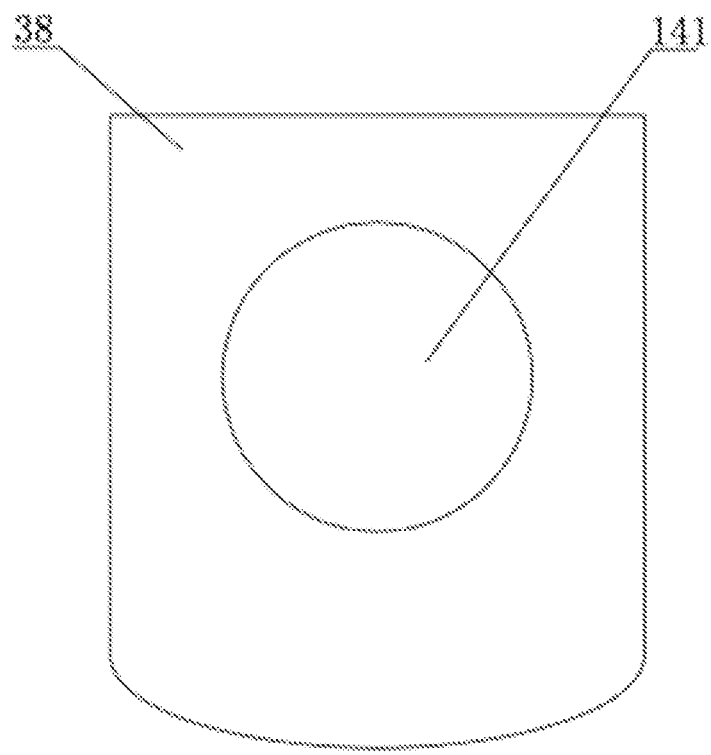
FIG. 6 is a structural diagram of a mark according to the present disclosure.
Figure 7:
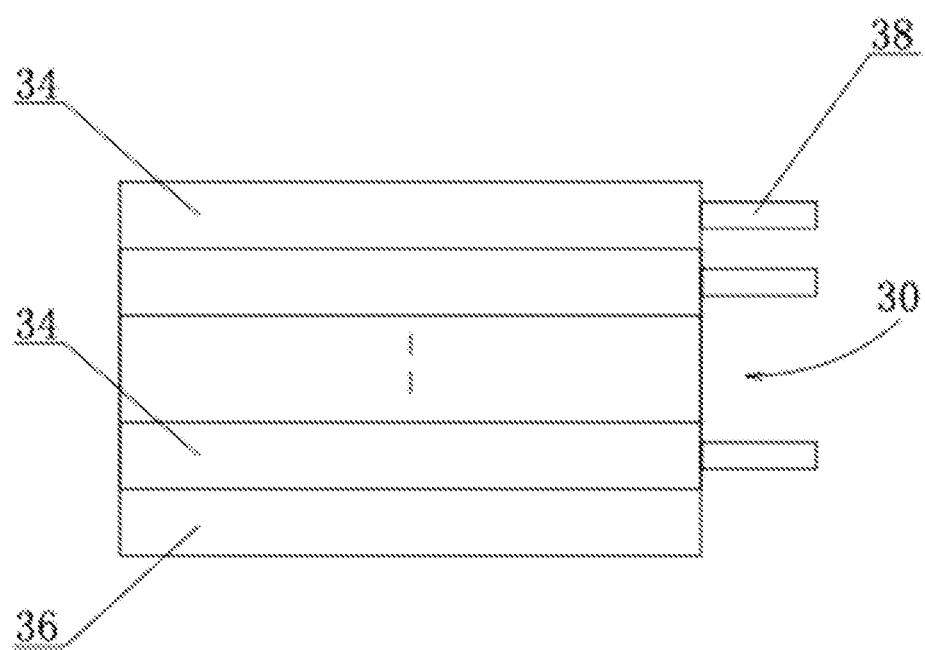
FIG. 7 is a diagram illustrating connection of the plurality of unit layers and an adhesive layer according to the present disclosure.
Figure 8:
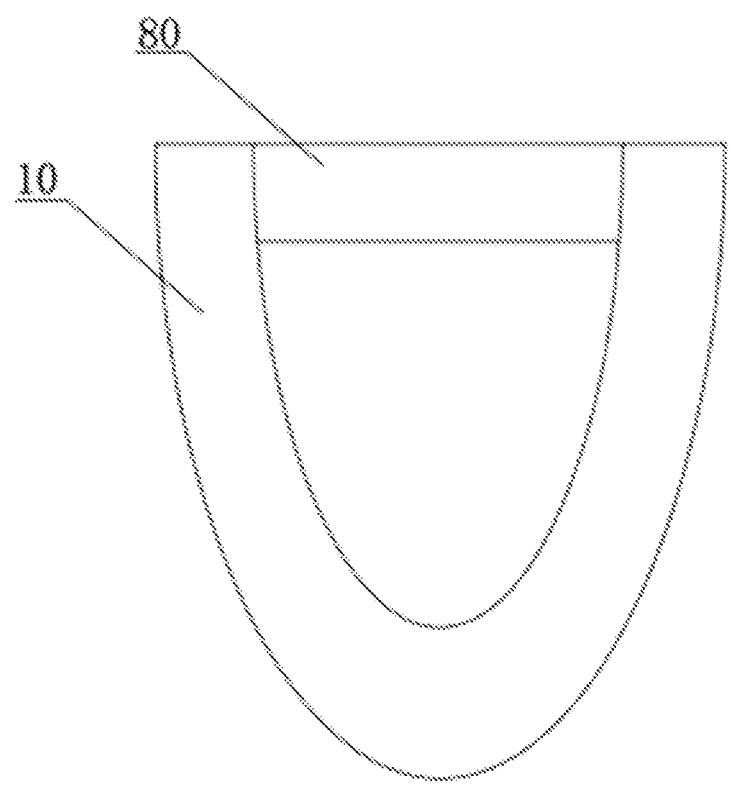
FIG. 8 a form of an adjusting part of an integral structure according to the present disclosure.
Figure 9:
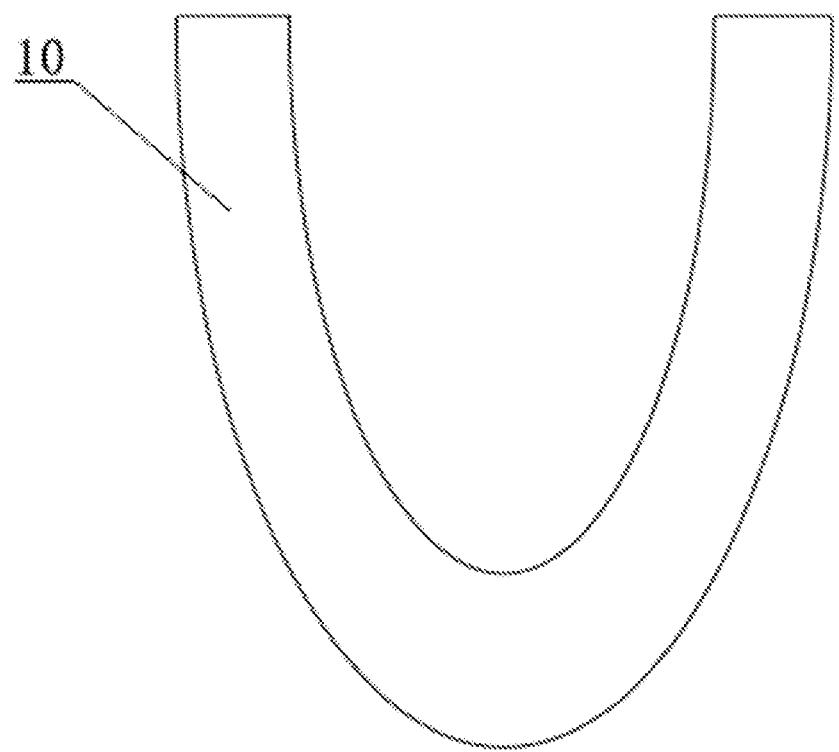
FIG. 9 is another form of an adjusting part of an integral structure according to the present disclosure.
Figure 10:
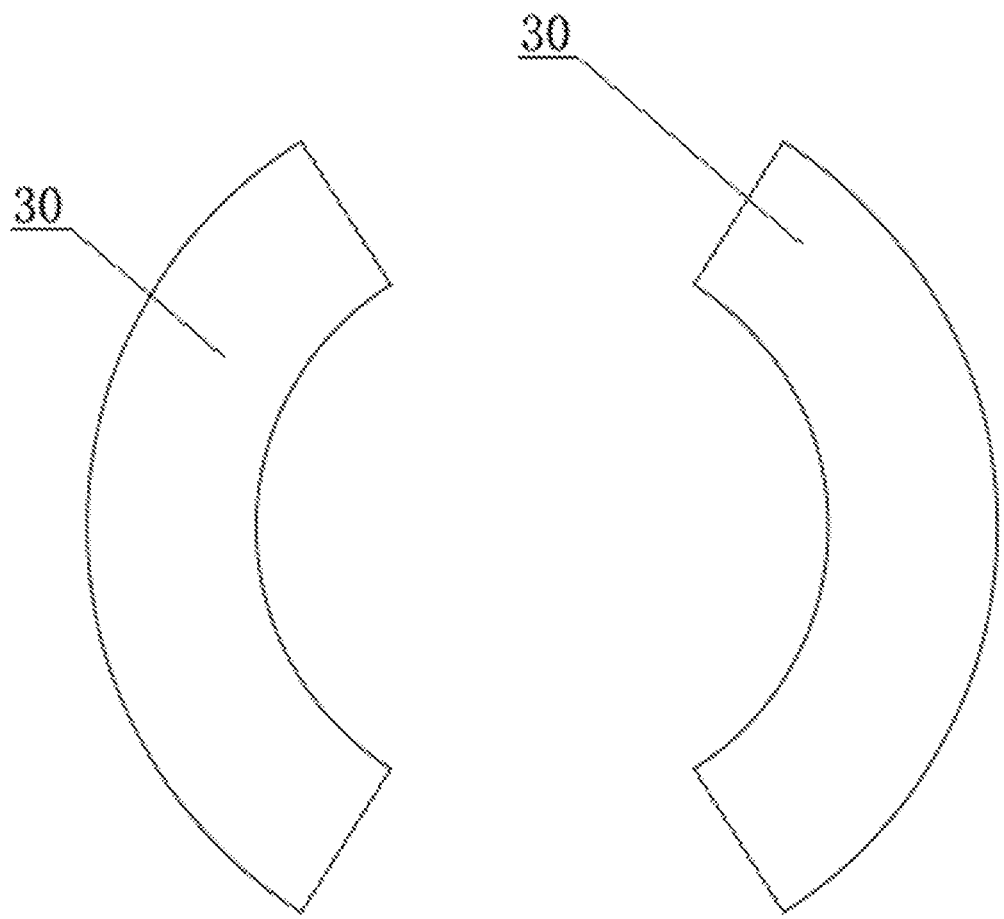
FIG. 10 is a diagram of a split structure according to the present disclosure.
Figure 11:
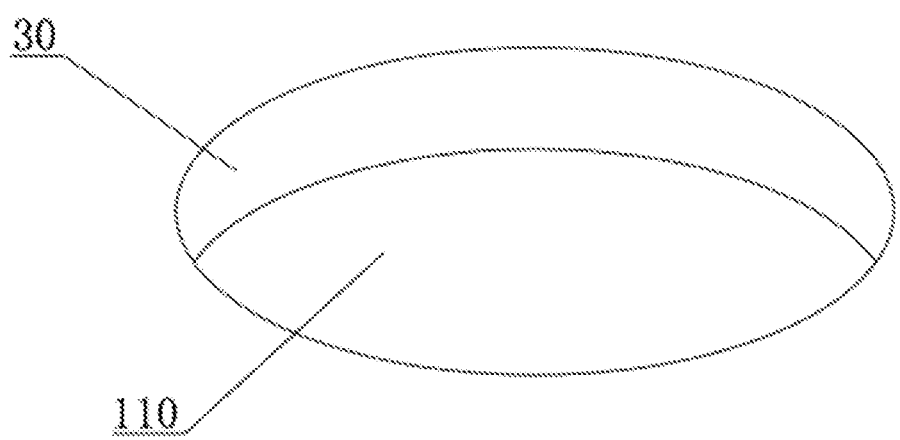
FIG. 11 is a diagram of a fixing part adopting a sleeve structure according to the present disclosure.
Figure 12:
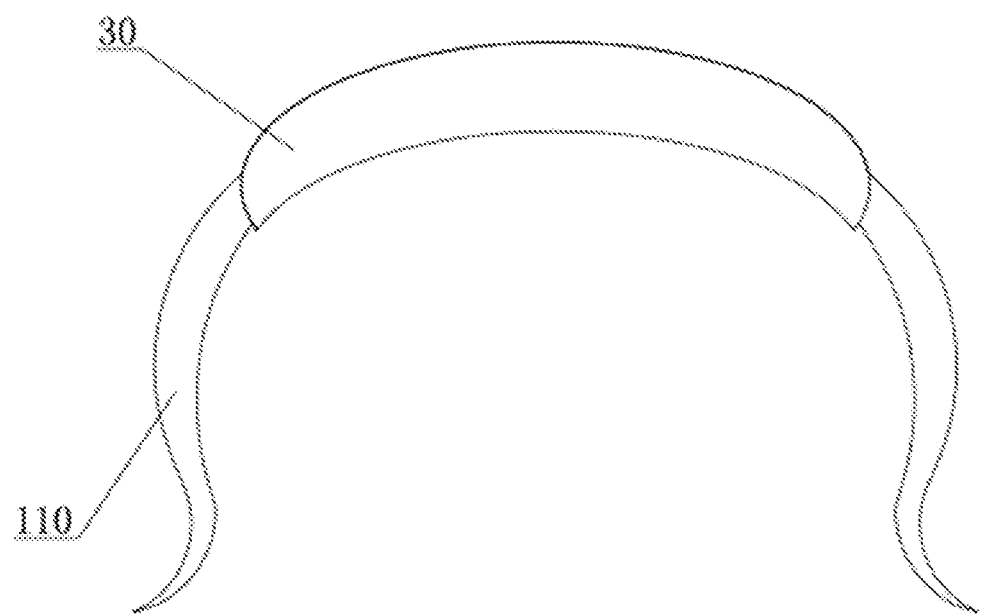
FIG. 12 is a diagram of a fixing part adopting a bandage structure according to the present disclosure.

As shown in FIG. 4, the film 30 may comprise more than one layer of unit layers, each unit layer comprises a surface layer 34, a base layer 30, and a bottom layer 36. The surface layer 34 is arranged at a first surface of the base layer 32, and the bottom layer 36 is arranged at a second surface of the base layer 32; the surface layer 34 comprises a release layer 48 for preventing skin adhesion; the bottom layer 36 is a bonding layer for bonding various unit layers, and the base layer 32 is made of a polymer material.

As described in the embodiment, the novel portable toilet seat cover 30 adopts an integral type, and the integral type is that one novel portable toilet seat cover 10 and 30 is independently used.

The nano silver may be added into the surface layer 34 of the toilet seat cover 30 in the present disclosure, and effects of sterilization and disinfection may be effectively achieved. The original intention of design for hygiene and cleanness is highlighted.

As described in the embodiment, the novel portable toilet seat cover 30 further comprises an adjusting part 80 which is used for being matched with different models of toilets. The adjusting part 80 adopts a retractable structure.

As described in the embodiment, the unit layer is provided with a bulge 38, the bulge 38 is arranged at the edge of the unit layer and used for facilitating tear-out of the unit layer.

As described in the embodiment, the bulge 38 is provided with a mark 141 for showing the quantity of the remaining available unit layers; and the mark 141 may show at least one of numbers, letters, characters, patterns, and colors.

As described in the embodiment, the novel portable toilet seat cover film 30 further comprises an adhesive layer 41, and the adhesive layer 41 is arranged at the bottom of the novel portable toilet seat cover film 30 and used for fixing the novel portable toilet seat cover 10. The adhesive layer 41 comprises a glue layer 42, and release paper 46. When the novel portable toilet seat cover film 30 is used, the release paper 46 is removed to put onto the novel portable toilet seat cover 10 by using the glue layer 42 of the adhesive layer 41.

As described in the embodiment, the surface layer 34 is made of a hydrophobic polymer resin.

Preferably, the surface layer 34 is made of one or more of paraffin, silicone grease, and silicone oil.

As described in the embodiment, the base layer 32 is mixed with and/or loaded with one or more of nano silver and antimicrobial peptide.

As described in the embodiment, the base layer 32 is made of a degradable polymer material, or flushable paper.

Preferably, the base layer 32 is made of one of more of polylactic acid, biodegradable PET (polyethylene terephthalate), polybutylene succinate, polybutylene caproate, polyhydroxybutyrate, polybutylene valerate, polyethylene succinate, polyester acid amine, polycaprolactone, polyvinyl alcohol, starch, and chitosan.

As described in the embodiment, the base layer 32 is made of other plastic added with an additive for enhancing degradation capability.

Preferably, the base layer 32 is made of plastic with flushable paper added with an additive for enhancing degradation capability, including one or more of polyvinyl chloride, polyethylene, polypropylene, and polystyrene.

Preferably, the bottom player 36 is made of one or more of acrylic glue, and an adhesive.

As described in the embodiment, the present disclosure further discloses a toilet, which comprises a novel portable toilet seat cover film 30.

Example 1

As shown in FIGS. 1-12, the novel portable toilet seat cover film 30 further comprises an adjusting part 80, which is used for being matched with different models of toilets. The adjusting part adopts a U-shaped opening structure, as shown FIG. 9.

Preferably, the surface layer 34 is made of one or more of paraffin, silicone grease, and silicone oil.

As described in the embodiment, the base layer 32 is mixed with and/or loaded with one or more of nano silver and antimicrobial peptide.

Example 2

As described in the embodiment, the novel portable toilet seat cover 30 adopts a split type, and the split type is that two novel portable toilet seat covers are respectively arranged on two sides of a toilet seat for simultaneous use.

As described in the embodiment, the novel portable toilet seat cover 30 further comprises a fixing part 110, and the fixing part 110 is used for fixing the novel portable toilet seat cover film 30. The fixing part 110 adopts a bandage structure.

As described in the embodiment, the novel portable toilet seat cover film 30 comprises 50-100 layers of the unit layer.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they can still make modifications to the technical solutions described in the foregoing embodiments, or make equivalent replacements to some or all the technical features thereof, as long as such modifications or replacements do not cause the essence of corresponding technical solutions to depart from the scope of the technical solutions of the embodiments of the present disclosure.

What is claimed is:

1. A novel portable toilet seat cover, comprising a multiple unit layers, each unit layer comprises:
    a surface layer, and
    a base layer, wherein the surface layer is arranged at a first surface of the base layer, and the surface layer comprises a release layer for preventing skin adhesion; the surface layer comprises a water impermissible polymer material, and the base layer comprises a flushable material.

2. The novel portable toilet seat cover according to claim 1, wherein the surface layer is made of a hydrophobic material; and the base layer is made of a degradable polymer material or plastic added with an additive for enhancing degradation capacity.

3. The novel portable toilet seat cover according to claim 2, wherein the surface layer is made of one or more of paraffin, silicone grease, and silicone oil; the base layer is made of one or more of polylactic acid, biodegradable PET (polyethylene terephthalate), polybutylene succinate, polybutylene caproate, polyhydroxybutyrate, polybutylene valerate, polyethylene succinate, polyester acid amine, polycaprolactone, polyvinyl alcohol, starch, chitosan, or one or more of polyvinyl chloride, polyethylene, polypropylene, and polystyrene added with an additive for enhancing the degradation capacity.

4. The novel portable toilet seat cover according to claim 1, wherein the base layer is mixed with or loaded with one or more of nano silver and antimicrobial peptide.

5. The novel portable toilet seat cover according to claim 1, wherein the unit layer is provided with a bulge, the bulge is arranged at the edge of the unit layer and used for facilitating tear-out of the unit layer.

6. The novel portable toilet seat cover according to claim 1, wherein the bulge is provided with a mark for prompting quantity of the remaining available unit layers; and the mark adopts at least one of numbers, letters, characters, patterns, and colors.

7. The novel portable toilet seat cover according to claim 1 further comprises an adjusting part, and the adjusting part adopts a retractable structure or an opening.

8. The novel portable toilet seat cover according to claim 1 further comprises an adhesive layer, and the adhesive layer is arranged at the bottom of the novel portable toilet seat cover.

9. The novel portable toilet seat cover according to claim 8 further comprises a semi-rigid annular body formed of a sheet of thin moldable resilient material, said body extending around a central opening of toilet and having inner and outer edges which extend continuously around said body wherein said inner edge is adjacent said central opening of the toilet, wherein the adhesive layer is attached to the semi-rigid annular body.

10. A replaceable cover adapted to fit over the seating surface of a toilet seat, the replaceable cover comprising:
  a semi-rigid annular body formed of a sheet of thin moldable resilient material, said body extending around a central opening and having inner and outer edges which extend continuously around said body wherein said inner edge is adjacent said central opening,
  said body having a top surface, wherein said inner edges curving inwardly and downwardly into said central opening and outer edge curving outwardly and downwardly to produce a shape which generally corresponds to the shape of the top surface of a toilet seat over which the cover is adapted to fit, and
  more than one layer of peelable, flushable, biodegradable unit layer formed on said contoured top surface of the replaceable cover.

11. The replaceable cover of claim 10, wherein each unit layer comprises a surface layer, and a base layer; the surface layer is arranged at a first surface of the base layer, and the surface layer comprises a release layer for preventing skin adhesion.

12. The replaceable cover of claim 11, further comprises a bottom layer comprises a bonding layer for bonding the various units.

13. The replaceable cover of claim 11, wherein the unit layer is provided with a bulge, the bulge is arranged at an edge of the unit layer and used for facilitating tear-out of the unit layer.

14. The replaceable cover of claim 13, wherein the bulge is provided with a mark for prompting quantity of the remaining available unit layers; and the mark adopts at least one of numbers, letters, characters, patterns, and colors.

15. The replaceable cover of claim 11 further comprises an adhesive layer, and the adhesive layer is attached to the contoured top surface of the replaceable cover.

16. The replaceable cover of claim 11 further comprises a fixing part, and the fixing part adopts a sleeve or a bandage structure.

17. The replaceable cover of claim 11 further comprises a locking mechanism that locks the cover to the toilet seat.

18. A replaceable cover adapted to fit over the seating surface of a toilet bowl, the cover comprising:
  a semi-rigid body of the cover formed of a sheet of thin moldable resilient material, said body extending around a central opening and having inner and outer edges which extend both sides around said body wherein said inner edge is adjacent said central opening,
  said body having a top surface which includes continuous inner and outer downwardly-depending edges; and
  a toilet seat, wherein semi-rigid body of the cover has a locking mechanism to lock to the toilet seat, wherein the toilet seat has the inner edge curving inwardly and downwardly into said central opening to said inner edge of said body and outer side curving outwardly and downwardly to said outer edge of said body to produce a contoured shape which generally corresponds to the shape of the surface of the toilet bowl which the toilet seat is adapted to fit.

19. The replaceable cover of claim 18, further comprising more than one layer of peelable, flushable, biodegradable unit layer formed on said contoured top surface.

20. The replaceable cover of claim 18, wherein each unit layer comprises a surface layer, a base layer; the surface layer is arranged at a first surface of the base layer, and the surface layer comprises a release layer for preventing skin adhesion.

* * * * *